(12) United States Patent  
Huang et al.

(10) Patent No.: US 9,086,849 B2  
(45) Date of Patent: Jul. 21, 2015

(54) ELECTRONIC EQUIPMENT

(71) Applicant: Acer Incorporated, New Taipei (TW)

(72) Inventors: Yi-Ta Huang, New Taipei (TW);
Cheng-Nan Ling, New Taipei (TW);
Hsien-Wei Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 84 days.

(21) Appl. No.: 13/951,367

(22) Filed: Jul. 25, 2013

(65) Prior Publication Data

US 2014/0301028 A1 Oct. 9, 2014

(30) Foreign Application Priority Data

Apr. 9, 2013 (TW) .............................. 102112436 A (51) Int. Cl.
| | |
|---|---|
| *G09G 3/36* | (2006.01) |
| *G06F 1/16* | (2006.01) |
| *G06F 3/0488* | (2013.01) |
| *G06F 3/14* | (2006.01) |

(52) U.S. Cl.
CPC .............. *G06F 1/1637* (2013.01); *G06F 1/162* (2013.01); *G06F 1/166* (2013.01); *G06F 1/1643* (2013.01); *G06F 3/0488* (2013.01); *G06F 3/1423* (2013.01)

(58) Field of Classification Search
None
See application file for complete search history.

(56) References Cited

U.S. PATENT DOCUMENTS

| | | | | |
|---|---|---|---|---|
| 6,266,236 | B1* | 7/2001 | Ku et al. ........................ | 345/169 |
| 7,283,355 | B2* | 10/2007 | Han .............................. | 345/173 |
| 2011/0012858 | A1* | 1/2011 | Brookes et al. ................ | 345/173 |

FOREIGN PATENT DOCUMENTS

| | | |
|---|---|---|
| CN | 2607606 | 3/2004 |
| CN | 201851851 | 6/2011 |

OTHER PUBLICATIONS

Taiwanese language office action dated Nov. 18, 2014.
English language translation of abstract of CN 2607606 (published Mar. 24, 2004).
English language translation of abstract of CN 201851851 (published Jun. 1, 2011).

* cited by examiner

*Primary Examiner* — Muhammad N Edun
(74) *Attorney, Agent, or Firm* — McClure, Qualey & Rodack, LLP (57) ABSTRACT

An electronic equipment includes a display device, an input device, a first connecting rod, and a second connecting rod. Two ends of the first connecting rod are respectively pivotable on sides of the display device and the input device, and two ends of the second connecting rod are respectively pivotable on the opposite sides of the display device and the input device. When the electronic equipment is in a tablet mode, the display device covers the input device, and the display device and the input device are located between the first and the second connecting rods.

12 Claims, 9 Drawing Sheets

ELECTRONIC EQUIPMENT

CROSS-REFERENCE TO RELATED APPLICATIONS

This Application claims priority of Taiwan Patent Application No. 102112463, filed on Apr. 9, 2013, the entirety of which is incorporated by reference herein.

BACKGROUND OF THE INVENTION

1. Field of the Invention

The present disclosure relates to an electronic equipment, and in particular, to an electronic equipment with connecting rods pivoting on a display device and an input device thereof.

2. Description of the Related Art

Since tablet computers and touch displays are popular, users often prefer operating devices by touch. Thus, touch displays are applied in some notebook computers, which can change to a tablet computer mode for convenient operation of the touch display.

In general, double-axis hinges are mounted on notebook computers with touch displays. However, a notebook computer with a double-axis hinge provides only two modes, a notebook computer mode and a tablet computer mode, because the double-axis hinges are disposed on the same side of the notebook computer. Thus, a notebook computer with double-axis hinges cannot provide more modes for operating for different purposes.

BRIEF SUMMARY OF THE INVENTION

To solve the problems of the prior art, the present disclosure provides an electronic equipment with a plurality of modes.

The present disclosure provides an electronic equipment including a display device, an input device, a first connecting rod, and a second connecting rod. The display device has a first side and a second side opposite to the first side. The input device has a third side and a fourth side opposite to the third side. The first connecting rod has a first end and a second end opposite the first end. The first end is pivotable on the first side, and the second end is pivotable on the third side. The second connecting rod has a third end and a fourth end opposite to the third side. The third end is pivotable on the second side, and the fourth end is pivotable on the fourth side. When the electronic equipment is in a tablet mode, the display device covers the input device, and the display device and the input device are located between the first connecting rod and the second connecting rod.

In conclusion, since the electronic equipment of the present disclosure utilizes two connecting rods pivotable on the display device and the input device, the display device and the input device may be respectively rotated relative to the connecting rod, and variable usage modes are provided by rotating the display device and the input device respectively to different positions.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
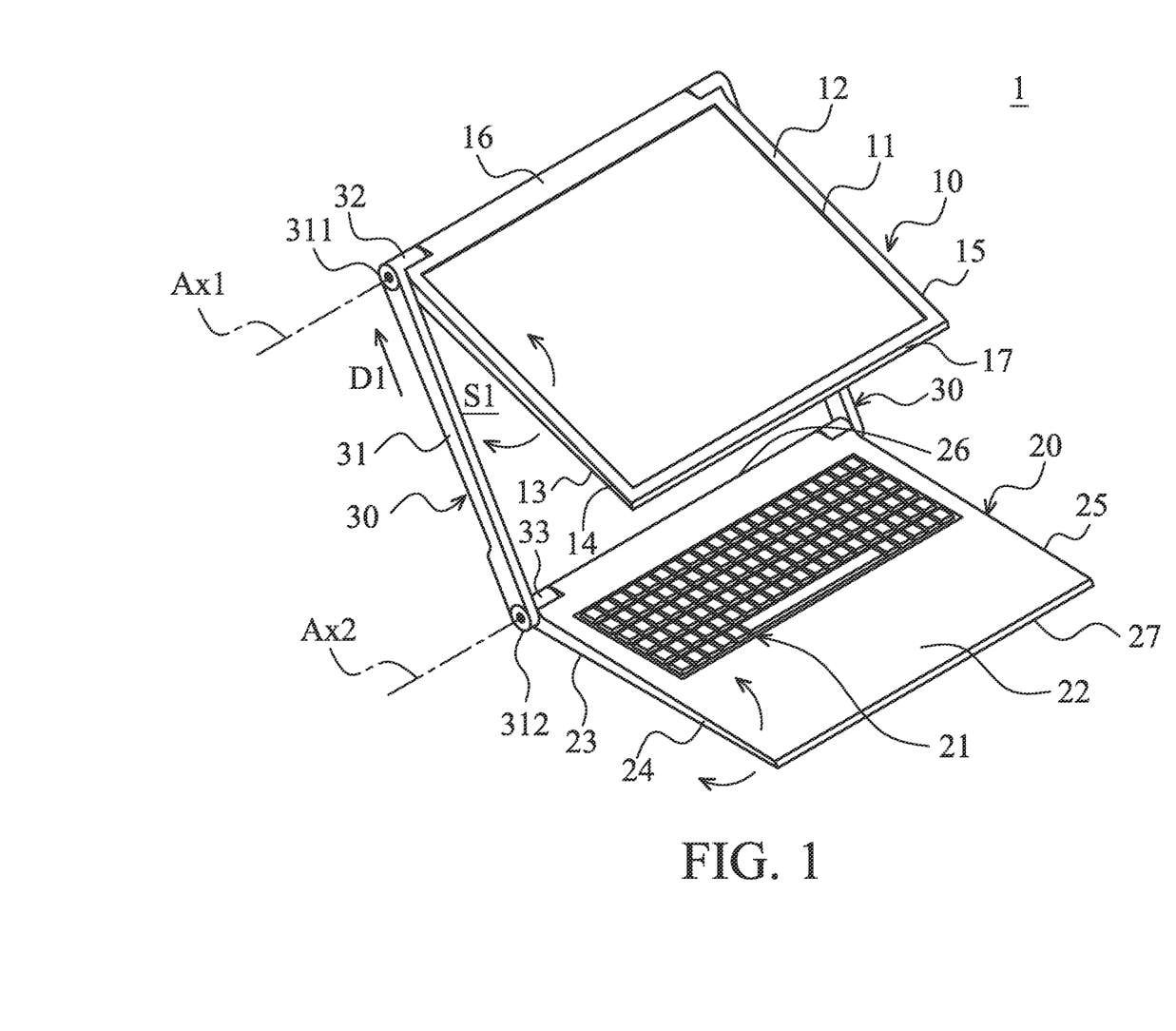
FIG. 1 is a perspective view of an the electronic equipment in a moving state according to a first embodiment of the present disclosure.

FIG. 1 is a perspective view of an electronic equipment 1 in a moving state according to a first embodiment of the present disclosure. The electronic equipment 1 includes a display device 10, an input device 20, and two connecting rods 30 (a first connecting rod and a second connecting rod). The display device 10 includes a display panel 11, such as a touch display panel. The display device 10 has a display surface 12, a back surface 13, a first side 14, a second side 15, a hinge side 16, and a freedom side 17. The display panel 11 is disposed on the display surface 12. The back surface 13 is opposite to the display surface 12. The first side 14 is opposite to the second side 15. The hinge side 16 is opposite to the freedom side 17. The first side 14, the hinge side 16, the second side 15, and the freedom side 17 are arranged around the display surface 12 and the back surface 13 in sequence.

The input device 20 includes an input module 21, such as a keyboard module, a touch display panel, or a touch panel. The input device 20 has a top surface 22, a back surface 23, a third side 24, a fourth side 25, a hinge side 26, and a freedom side 27. The input module 21 is disposed on the top surface 22, and the back surface 23 is opposite to the top surface 22. The third side 24 is opposite to the fourth side 25. The hinge side 26 is opposite to the freedom side 27. The third side 24, the hinge side 26, the fourth side 25, and the freedom side 27 are arranged around the top surface 22 and the back surface 23 in sequence.

The two connecting rods 30 extend along an extending direction D1, and are parallel to each other. A receiving space S1 is formed between the two connecting rods 30. The ends 311 of the two connecting rods 30 are respectively pivotable on the first side 14 and the second side 15 of the display device 10 near a hinge side 16. The ends 312, opposite to the ends 311, of the two connecting rods 30 are respectively pivotable on the third side 24 and the fourth side 25 of the input device 20 near the hinge side 26.

A first axis AX1 passes through the ends 311 of the two connecting rods 30 and the display device 10, and the two connecting rods 30 are rotatable about the first axis AX1 relative to the display device 10. A second axis AX2 passes through the ends 312 of the two connecting rods 30 and the input device 20, and the two connecting rods 30 are rotatable about the second axis AX2 relative to the input device 20. The first axis AX1 and the second axis AX2 are perpendicular to the extending direction D1. The first axis AX1 is near the hinge side 16 of the display device 10, and the second axis AX2 is near the hinge side 26 of the input device 20.

In the embodiment, each of the connecting rod 30 includes a rod body 31, a first hinge 32, and a second hinge 33. The rod body 31 is extended along the extending direction D1. The first and second hinges 32 and 33 are respectively connected to two ends of the rod body 31, and are perpendicular to the rod body 31 and the extending direction D1. Thus, the rod body 31, the first hinge 32, and the second hinge 33 are formed as a U-shaped structure. The two first hinges 32 are respectively pivotable on the first side 14 and the second side 15 of the display device 10 near the hinge side 16. The two second hinges 33 are respectively pivotable on the third side 24 and the fourth side 25 of the input device 20 near the hinge side 26.

Therefore, the display device 10 can be rotated 360 degrees about the first axis AX1 relative to the connecting rods 30 in a clockwise or counterclockwise manner. The input device 20 can be rotated 360 degrees about the second axis AX2 relative to the connecting rod 30 in a clockwise or counterclockwise manner. Thus, in the embodiment, the electronic equipment 1 includes different usage modes by rotating the display device 10 and/or the input device 20 to different positions relative to the connecting rods 30. The different usage modes of the electronic equipment 1 are illustrated as follows.

Figure 2:
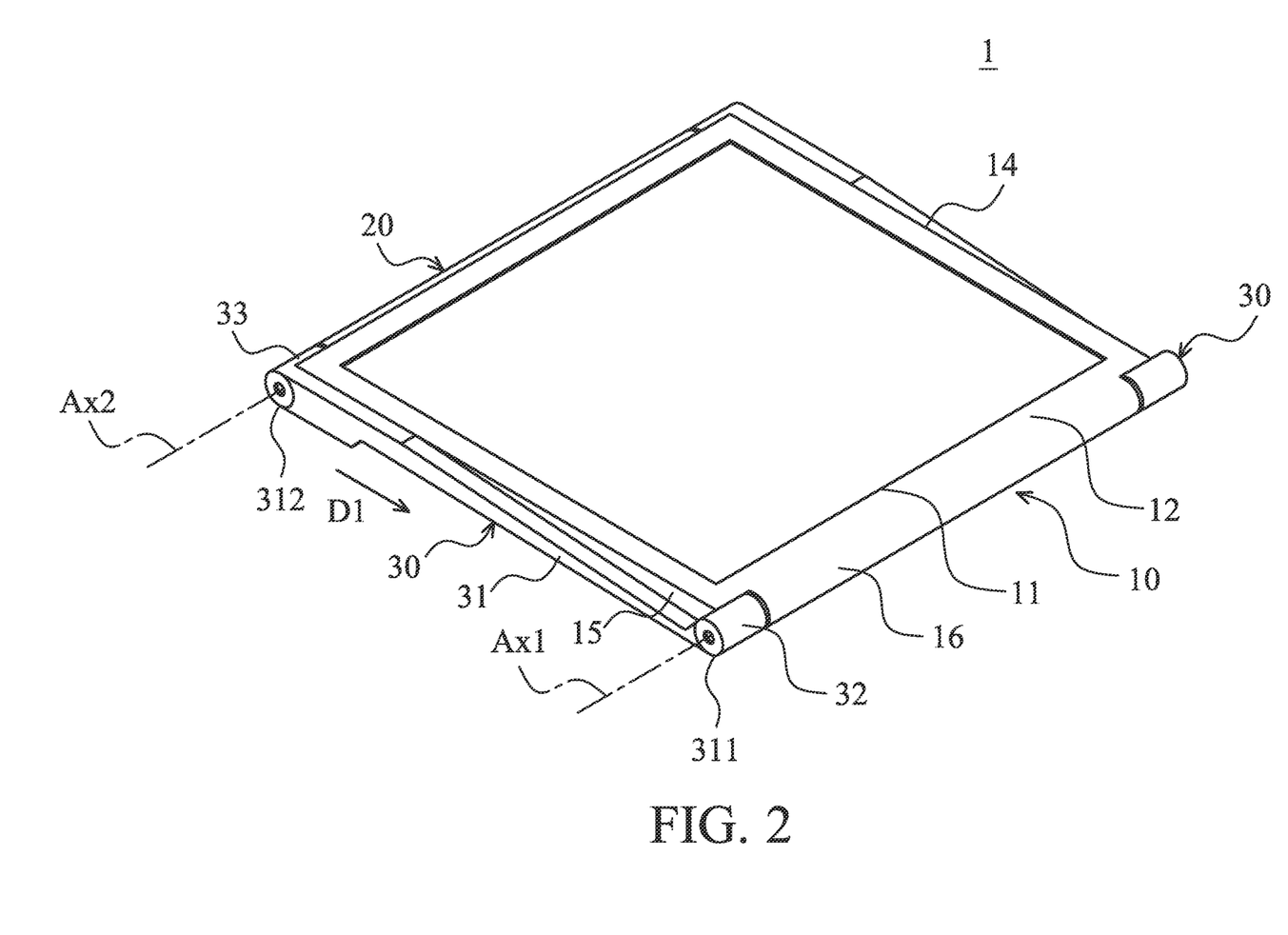
FIG. 2 is a perspective view of the electronic equipment in a tablet mode according to the first embodiment of the present disclosure.
Figure 3:
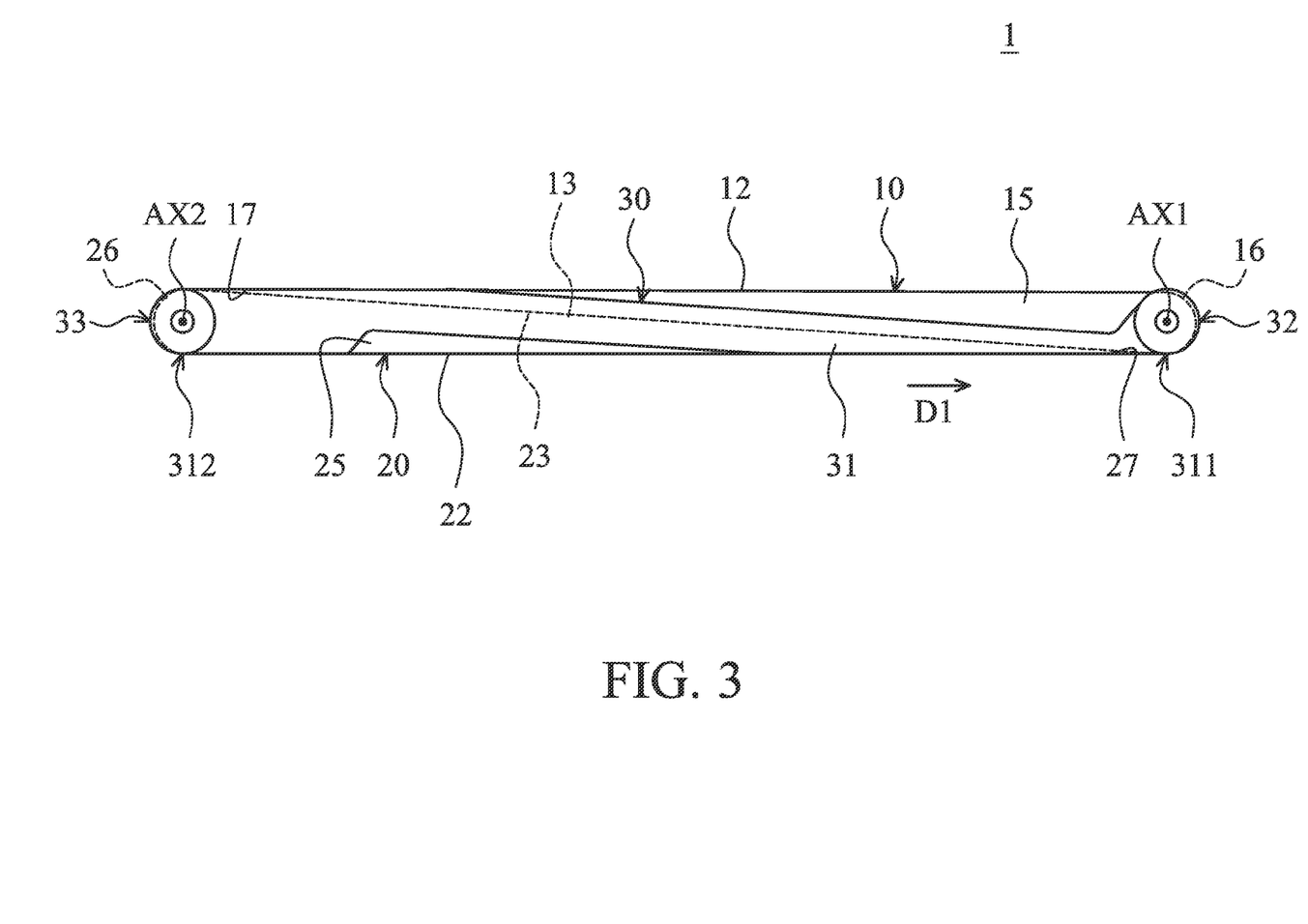
FIG. 3 is a side view of the electronic equipment at the tablet mode according to the first embodiment of the present disclosure.

FIG. 2 is a perspective view of the electronic equipment 1 in a tablet mode according to the first embodiment of the present disclosure. FIG. 3 is a side view of the electronic equipment 1 in the tablet mode according to the first embodiment of the present disclosure. When the electronic equipment 1 is in a tablet mode, the display device 10 covers the input device 20, and the display device 10 and the input device 20 are located between the two connecting rods 30. The display device 10 and the input device 20 cover the receiving space S1 (as shown in FIG. 1).

As shown in FIG. 3, the display device 10 and the input device 20 are wedge structures. When the display device 10 covers the input device 20, the display surface 12 of the display device 10 and the top surface 22 of the input device 20 are substantially parallel to each other. The maximum thickness of the display device 10 or the input device 20 is smaller than or equal to the maximum width of the connecting rod 30. The display device 10 and the input device 20 are substantially parallel to the two connecting rods 30. The display device 10 and the two connecting rods 30 are extended from the first axis AX1 along the same direction, and the input device 20 and the two connecting rods 30 are extended from the second axis AX2 along the same direction.

Figure 4:
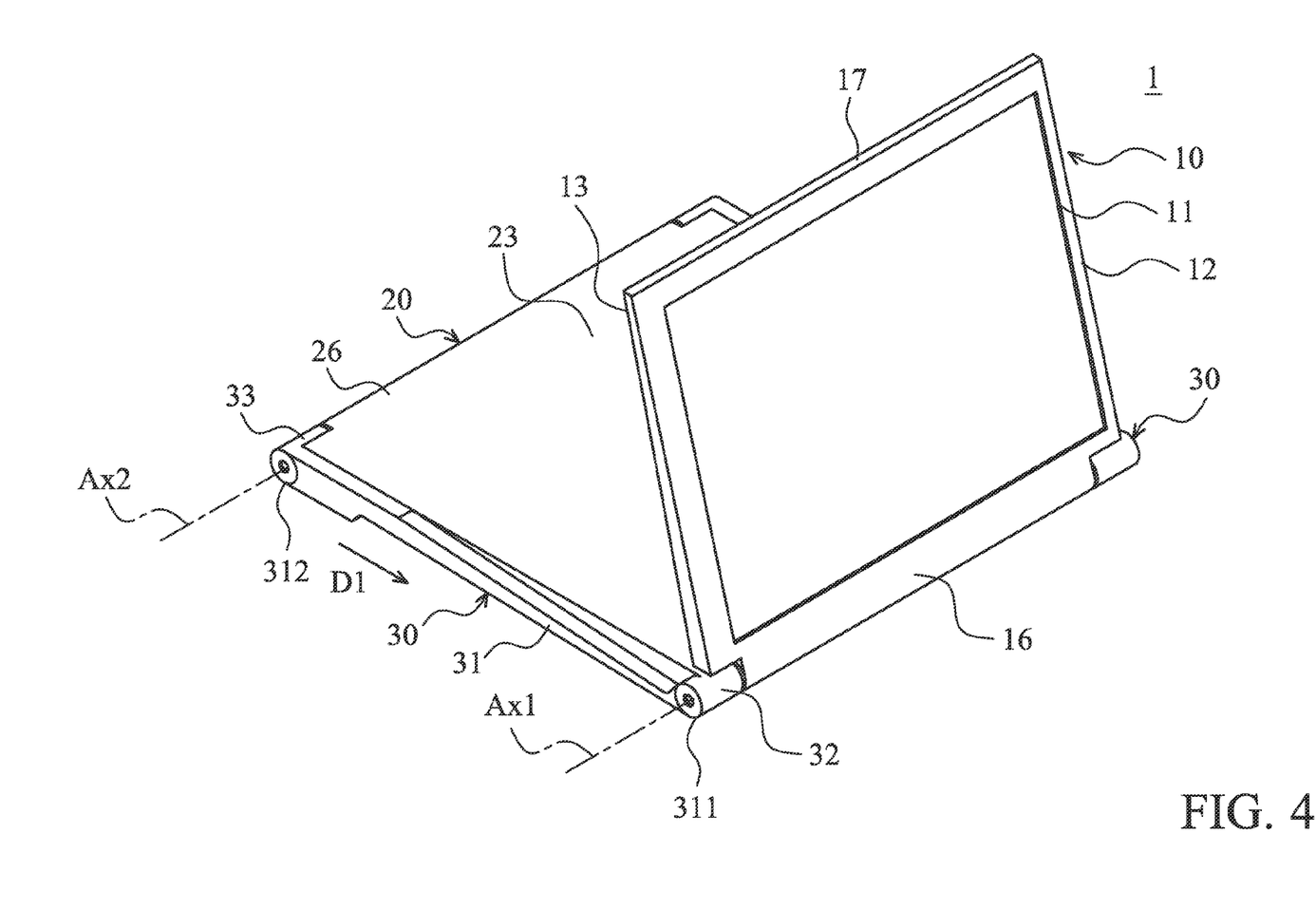
FIG. 4 is a perspective view of the electronic equipment in a viewing mode according to a first embodiment of the present disclosure.

FIG. 4 is a perspective view of the electronic equipment 1 in a viewing mode according to a first embodiment of the present disclosure. When the electronic equipment 1 is in a viewing mode, the display device 10 is inclined relative to the input device 20, and an acute angle is between the display device 10 and the input device 20. The display surface 12 of the display device 10 faces upward. The input device 20 is substantially parallel to the two connecting rods 30, and covers the receiving space S1 (as shown in FIG. 1). The input device 20 and the two connecting rods 30 extend from the second axis AX2 along the same direction.

Figure 5:
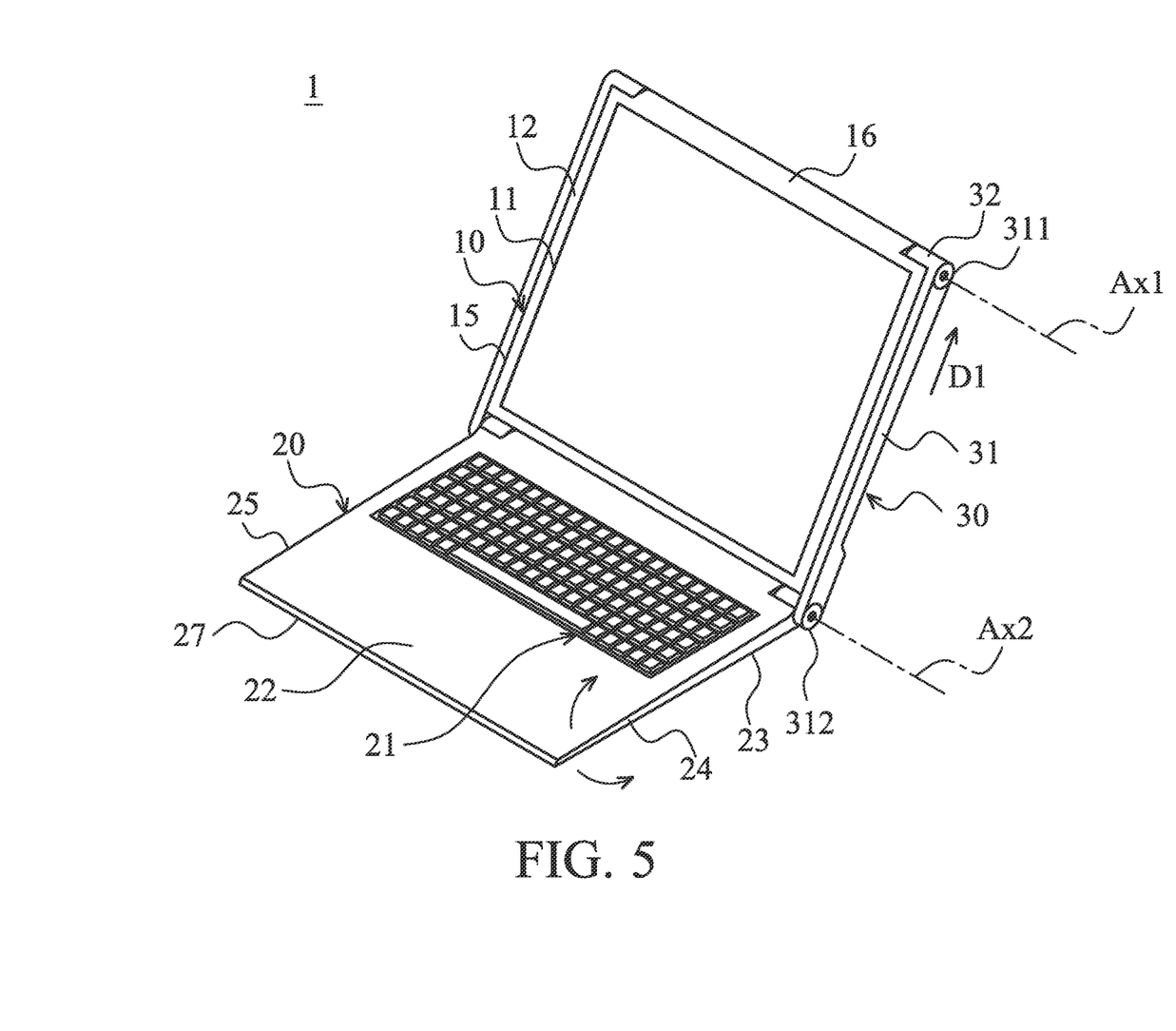
FIG. 5 is a perspective view of the electronic equipment in a notebook mode according to the first embodiment of the present disclosure.

FIG. 5 is a perspective view of the electronic equipment 1 in a notebook mode according to the first embodiment of the present disclosure. When the electronic equipment 1 is in a notebook mode, the display device 10 is inclined relative to the input device 20. A blunt angle is between the display device 10 and the input device 20. The display surface 12 corresponds to the top surface 22 of the input device 20. The display device 10 is substantially parallel to the two connecting rods 30, and covers the receiving space S1 (as shown in FIG. 1). The display device 10 and the two connecting rods 30 are extended from the first axis AX1 along the same direction.

Figure 6:
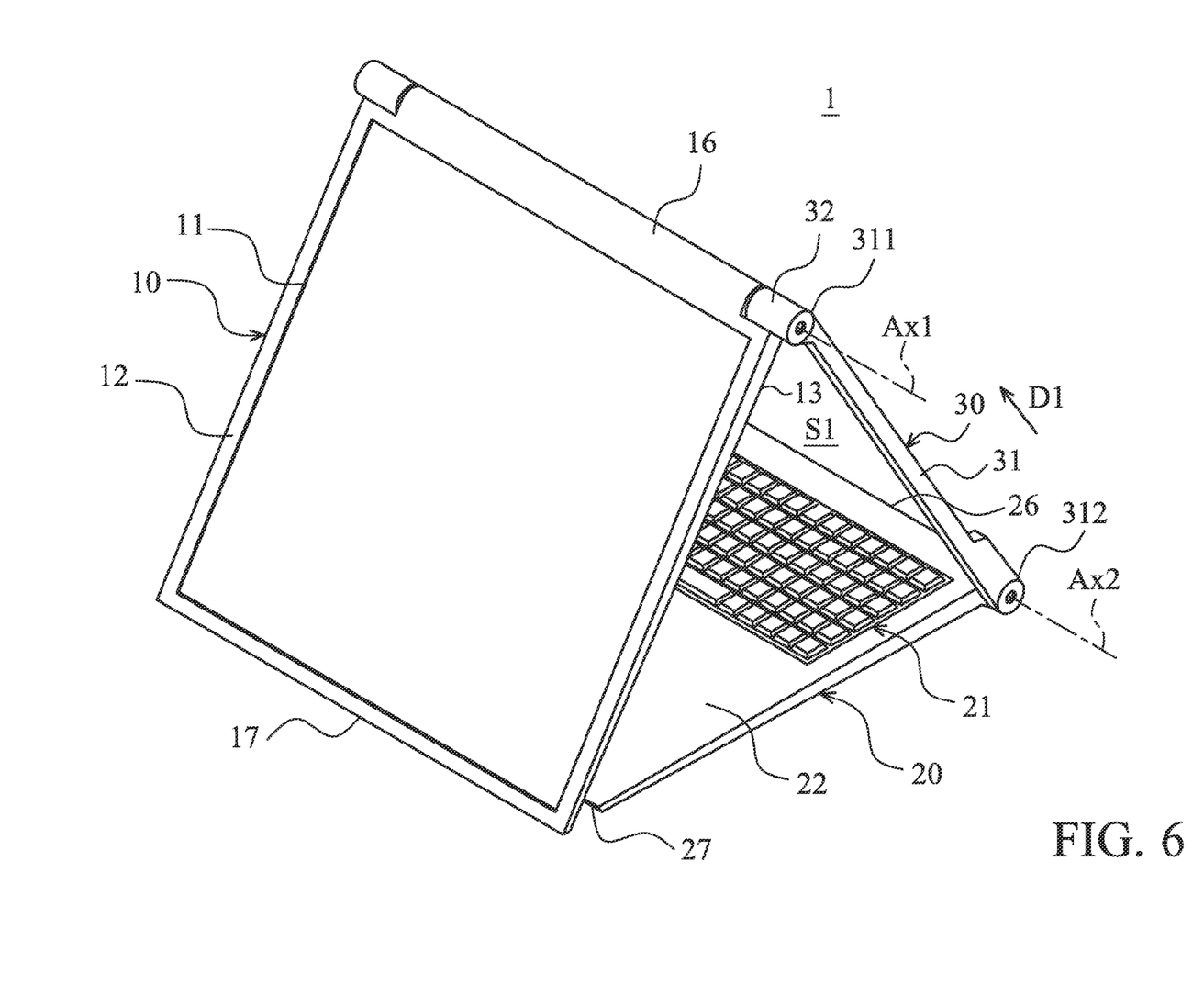
FIG. 6 is a perspective view of the electronic equipment in a rack mode according to the first embodiment of the present disclosure.

FIG. 6 is a perspective view of the electronic equipment 1 in a rack mode according to the first embodiment of the present disclosure. When the electronic equipment 1 is in a rack mode, the display device 10 is inclined relative to the input device 20. The back surface 13 of the display device 10 faces the top surface 22 of the input device 20. The display device 10, the input device 20, and the two connecting rods 30 are formed as a triangular structure. The receiving space S1 is not covered by the display device 10 and the input device 20.

Figure 7:
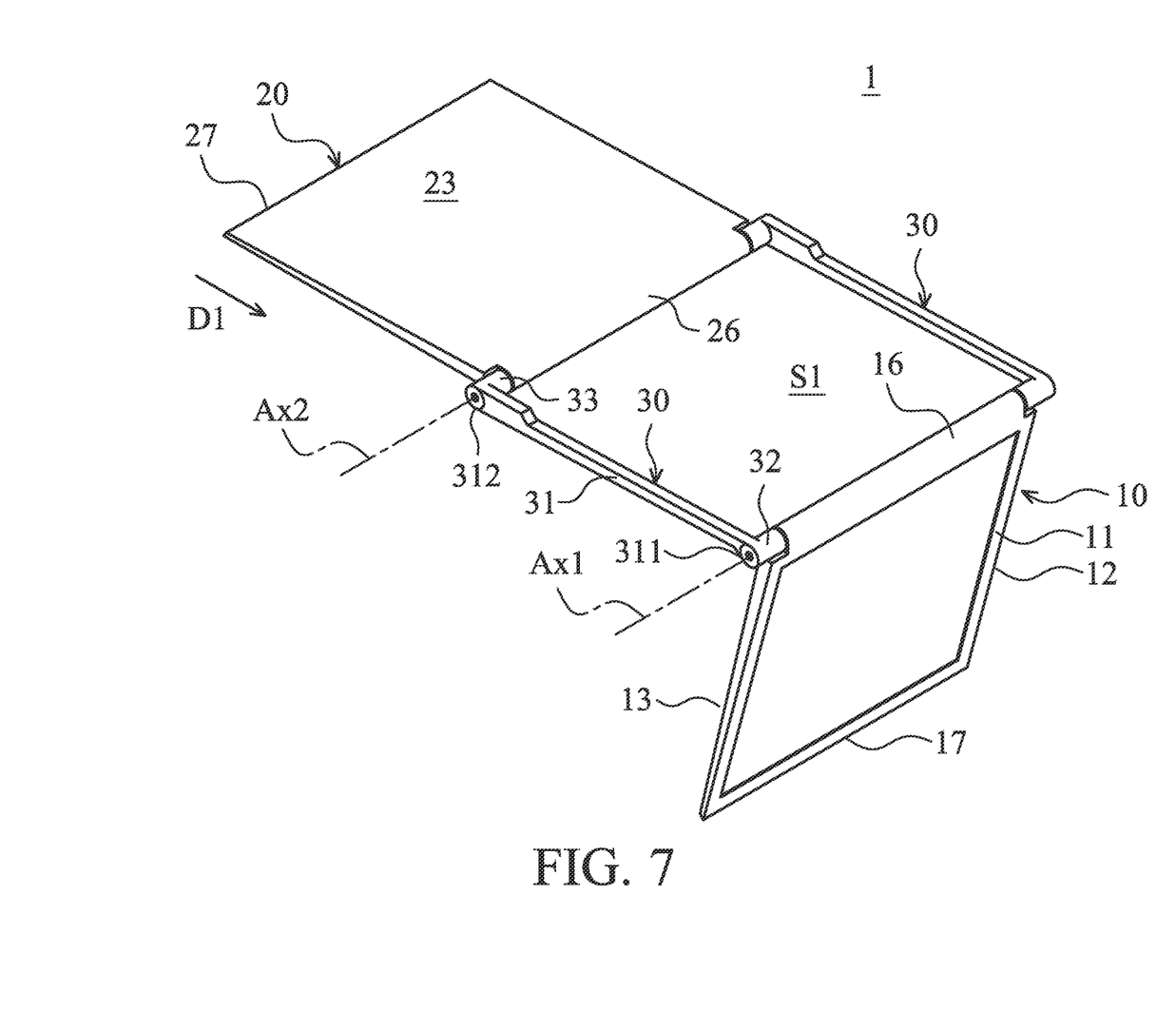
FIG. 7 is a perspective view of the electronic equipment in a hanging mode according to the first embodiment of the present disclosure.

FIG. 7 is a perspective view of the electronic equipment 1 in a hanging mode according to the first embodiment of the present disclosure. When the electronic equipment 1 is in a hanging mode, the display device 10 is inclined relative to the two connecting rods 30. An acute angle is between the display device 10 and the two connecting rods 30. The input device 20 is substantially parallel to the two connecting rods 30, and the input device 20 and the two connecting rods 30 are extended from the second axis AX2 along two opposite directions. In this case, the receiving space S1 is not covered by the display device 10 and the input device 20.

Figure 8:
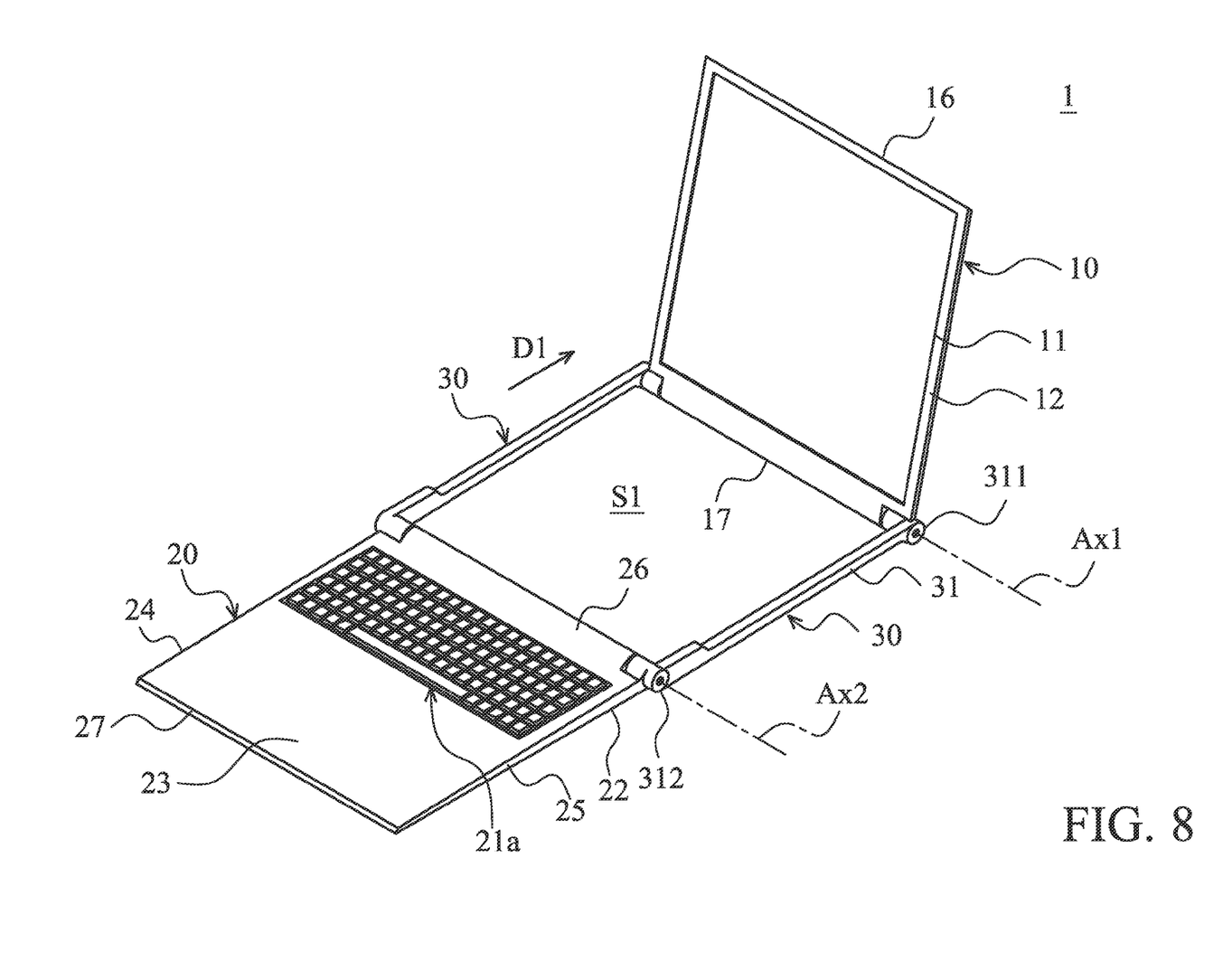
FIG. 8 is a perspective view of the electronic equipment in a far-viewing mode according to the first embodiment of the present disclosure.

FIG. 8 is a perspective view of the electronic equipment 1 in a far-viewing mode according to the first embodiment of the present disclosure. When the electronic equipment 1 is in a far-viewing mode, the display device 10 is inclined relative to the two connecting rods 30, and a blunt angle is between the display device 10 and the two connecting rods 30. The input device 20 is substantially parallel to the two connecting rods 30, and the input device 20 and the two connecting rods 30 are extended from the second axis AX2 along two opposite directions. An input module 21a is further included and disposed on the back surface 23 of the input device 20. In this case, the receiving space S1 is not covered by the display device 10 and the input device 20.

Figure 9:
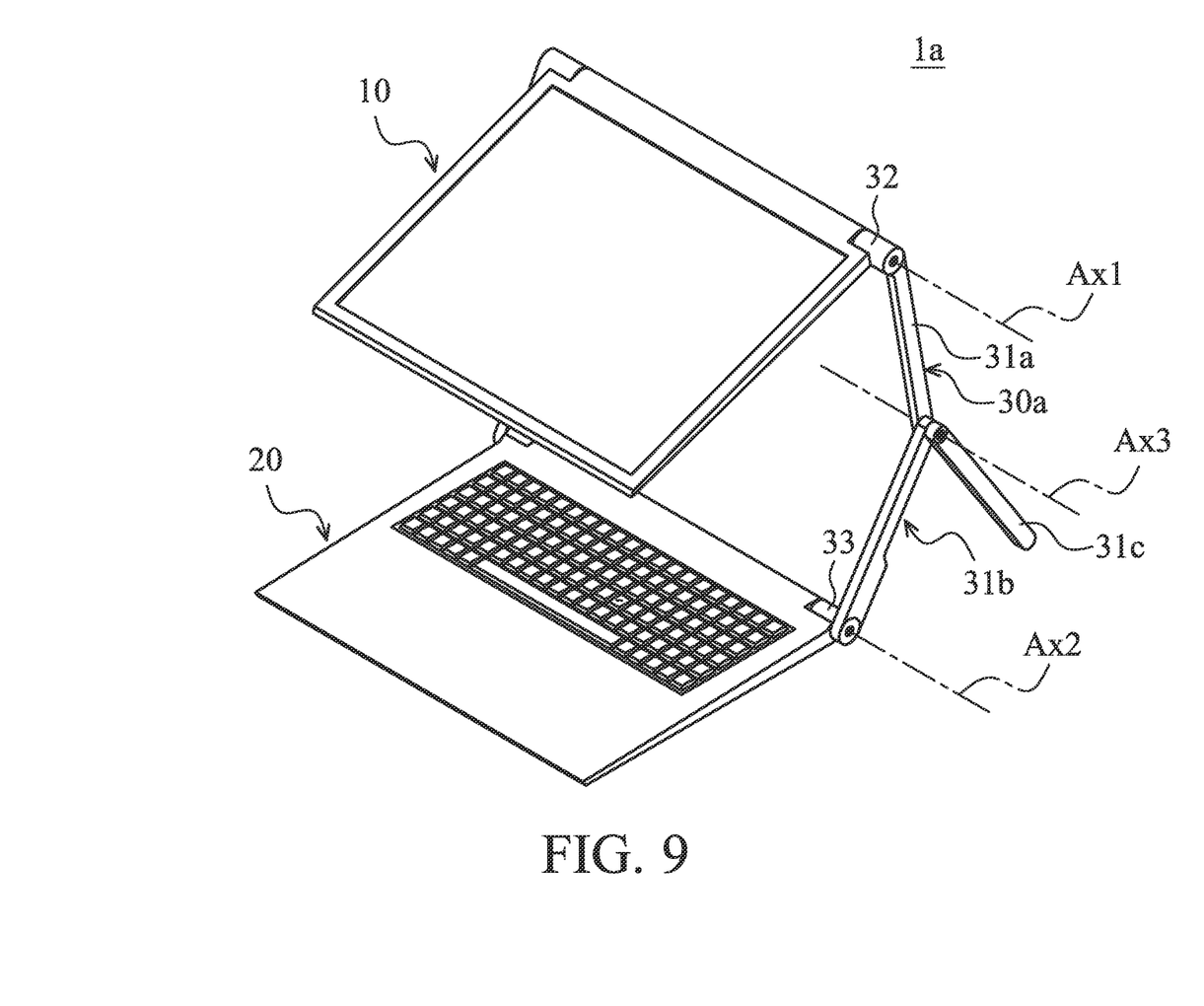
FIG. 9 is a perspective view of the electronic equipment in a moving state according to a second embodiment of the present disclosure.

FIG. 9 is a perspective view of the electronic equipment 1 in a moving state according to a second embodiment of the present disclosure. The differences between the second embodiment and the first embodiment are described as follows. Each of the two connecting rods 30a respectively includes a rod body 31a, a rod body 31b, and an auxiliary rod body 31c. The first ends of the two rod bodies 31a are respectively pivotable on the first side 14 and the second side 15 of the display device 10. The two ends of one of the rod bodies 31b are respectively pivotable on the third side 24 of the input device 20 and a second end of one of the rod bodies 31a. The two ends of the other rod body 31b are respectively pivotable on the fourth side 25 of the input device 20 and a second end of the other rod body 31a. The ends of the two auxiliary rod bodies 31c are respectively pivotable on the second ends of the rod bodies 31a. In other words, the rod bodies 31a and 31b, and the auxiliary rod body 31c are respectively rotated about the third axis AX3. By the rod bodies 31a and 31b, variable operation modes and visual angles are provided, and a more stable support of the electronic equipment 1 is applied by the auxiliary rod body 31c.

In conclusion, since the electronic equipment of the present disclosure utilizes two connecting rods pivotable on the display device and the input device, the display device and the input device may be respectively rotated relative to the connecting rod, and variable usage mode are provided by rotating the display device and the input device respectively to different positions.

The disclosed features may be combined, modified, or replaced in any suitable manner in one or more disclosed embodiments, but are not limited to any particular embodiments. The words, such as "first" or "second", in the specification are for the purpose of clarity description only, but are not relative to the claims or to limit the scope of the claims. In addition, the terms, such as "first feature" and "second feature", do not indicate to the same or different features.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic equipment, comprising:
    a display device having a first side and a second side opposite to the first side;
    an input device having a top surfaces, a back surface opposite to the top surface, a third side, a fourth side opposite to the third side, and an input module disposed on the top surface;
    a first connecting rod having a first end and a second end opposite to the first end, wherein the first end is pivotable on the first side, and the second end is pivotable on the third side; and
    a second connecting rod having a third end and a fourth end opposite to the third side, wherein the third end is pivotable on the second side, and the fourth end is pivotable on the fourth side,
    wherein when the electronic equipment is in a tablet mode, the display device covers the back surface of the input device, and the display device and the input device are located between the first connecting rod and the second connecting rod.

2. The electronic equipment as claimed in claim 1, wherein a receiving space is formed between the first connecting rod and the second connecting rod, and when the electronic equipment is in a tablet mode, the display device and the input device covers the receiving space.

3. The electronic equipment as claimed in claim 2, wherein the display device has a display surface and a back surface opposite to the display surface, and when the electronic equipment in a viewing mode, the display device is inclined relative to the input device, and the back surface of the display device faces the input device, and the input device covers the receiving space.

4. The electronic equipment as claimed in claim 2, wherein the display device has a display surface and a back surface opposite to the display surface, and when the electronic equipment is in a notebook mode, the display device is inclined relative to the input device, and the display surface corresponds to the input device, and the display device covers the receiving space.

5. The electronic equipment as claimed in claim 1, wherein the display device has a display surface and a back surface opposite to the display surface, and when the electronic equipment is in a rack mode, the display device is inclined relative to the input device, and the back surface of the display device faces the input device, and the display device, the input device, and the first connecting rod and the second connecting rod are formed as a triangular structure.

6. The electronic equipment as claimed in claim 1, wherein the first connecting rod and the second connecting rod are rotatable about an axis, passing through the second end and the fourth end, relative to the input device, and when the electronic equipment is in a hanging mode, the display device is inclined relative to the first and the second connecting rods, and an acute angle is between the display device and the first and the second connecting rods, and the input device and the first and the second connecting rods extend from the axis along two opposite directions.

7. The electronic equipment as claimed in claim 1, wherein the first connecting rod and the second connecting rod are rotatable about an axis, passing through the second end and the fourth end relative to the input device, and when the electronic equipment is in a far-viewing mode, the display device is inclined relative to the first and the second connecting rods, and a blunt angle is between the display device and the first and the second connecting rods, and the input device and the first and the second connecting rods extend from the axis along two opposite directions.

8. The electronic equipment as claimed in claim 1, wherein the first connecting rod comprises:
    a first rod body pivotable on the first side; and
    a second rod body pivotable on the third side and the first rod body.

9. The electronic equipment as claimed in claim 8, wherein the first connecting rod comprises a first auxiliary rod body pivotable on the first rod.

10. The electronic equipment as claimed in claim 8, wherein the second connecting rod comprises:
    a third rod body pivotable on the second side; and
    a fourth rod body pivotable on the fourth side and the third rod.

11. The electronic equipment as claimed in claim 10, wherein the second connecting rod comprises a second auxiliary rod body pivotable on the third rod.

12. The electronic equipment as claimed in claim 10, wherein the display device and the input device are wedge structures, and when the display device covers the input device, the maximum thickness of the display device or the input device is smaller than or equal to the maximum width of the first connecting rod.

* * * * *